(12) United States Patent
Rodenburg et al.

(10) Patent No.: US 7,792,246 B2
(45) Date of Patent: Sep. 7, 2010

(54) HIGH RESOLUTION IMAGING

(75) Inventors: John Marius Rodenburg, Sheffield (GB); Helen Mary Louise Faulkner, South Yarra (AU)

(73) Assignee: Phase Focus Ltd, Sheffield (GB)

(*) Notice: Subject to any disclaimer, the term of this patent is extended or adjusted under 35 U.S.C. 154(b) by 446 days.

(21) Appl. No.: 11/587,627

(22) PCT Filed: Apr. 15, 2005

(86) PCT No.: PCT/GB2005/001464
§ 371 (c)(1), (2), (4) Date: Dec. 17, 2007

(87) PCT Pub. No.: WO2005/106531
PCT Pub. Date: Nov. 10, 2005

(65) Prior Publication Data
US 2008/0095312 A1    Apr. 24, 2008

(30) Foreign Application Priority Data
Apr. 29, 2004 (GB) .................. 0409572.5

(51) Int. Cl.
G21K 7/00 (2006.01)
G01N 23/04 (2006.01)
G01N 23/20 (2006.01)

(52) U.S. Cl. .................. 378/43; 378/62; 378/71; 378/87

(58) Field of Classification Search .......... 378/6, 378/87, 37, 43, 57, 62, 71
See application file for complete search history.

(56) References Cited

U.S. PATENT DOCUMENTS

| 3,882,310 | A | * | 5/1975 | Barrett ........................ 378/2 |
| 4,309,602 | A | | 1/1982 | Gonsalves et al. |
| 4,480,332 | A | * | 10/1984 | Strecker ..................... 378/87 |
| 4,870,674 | A | * | 9/1989 | Schmahl et al. .............. 378/43 |
| 5,353,236 | A | | 10/1994 | Subbiah |
| 5,367,375 | A | | 11/1994 | Siebert |
| 5,982,954 | A | | 11/1999 | Delen et al. |
| 6,005,916 | A | * | 12/1999 | Johnson et al. ............... 378/87 |

(Continued)

FOREIGN PATENT DOCUMENTS

EP    1 062 914    12/2000

(Continued)

OTHER PUBLICATIONS

Written Opinion with International Search Report for International Application No. PCT/GB2005/001464.

*Primary Examiner*—Edward J Glick
*Assistant Examiner*—Thomas R Artman
(74) *Attorney, Agent, or Firm*—Klarquist Sparkman, LLP

(57) ABSTRACT

A method and apparatus for providing image data which can be used to construct a high resolution image of a region of a target object is disclosed. An embodiment of the method includes the acts of providing incident radiation from a radiation source at a target object, via at least one detector, detecting the intensity of radiation scattered by the target object and providing the image data responsive to the detected intensity without high resolution positioning of the incident radiation or a post target object aperture relative to the target object.

44 Claims, 10 Drawing Sheets

U.S. PATENT DOCUMENTS

| | | |
|---|---|---|
| 6,018,564 A | 1/2000 | Wilkins |
| 6,049,074 A | 4/2000 | Endo et al. |
| 6,163,592 A | 12/2000 | He et al. |
| 6,175,117 B1 * | 1/2001 | Komardin et al. ...... 250/363.06 |
| 6,212,254 B1 * | 4/2001 | Wilkins ..................... 378/62 |
| 6,226,353 B1 | 5/2001 | Wilkins et al. |
| 6,229,877 B1 | 5/2001 | Agano |
| 6,369,932 B1 | 4/2002 | Gerchberg |
| 6,483,891 B1 * | 11/2002 | Lazarev et al. ................. 378/37 |
| 6,493,422 B2 | 12/2002 | Wilkins et al. |
| 6,545,790 B2 | 4/2003 | Gerchberg |
| 6,704,591 B2 | 3/2004 | Sakaida |
| 6,810,141 B2 | 10/2004 | Barbour |
| 6,885,442 B1 | 4/2005 | Nugent et al. |
| 6,906,839 B2 * | 6/2005 | Gerchberg ................ 359/237 |
| 6,972,905 B2 | 12/2005 | Ludwig |
| 7,039,252 B2 | 5/2006 | Ludwig |
| 7,039,553 B2 | 5/2006 | Nugent et al. |
| 7,054,504 B2 | 5/2006 | Ludwig |
| 7,099,436 B2 * | 8/2006 | Francke et al. ................ 378/62 |
| 7,474,728 B2 * | 1/2009 | Schlomka et al. .............. 378/6 |
| 2002/0041653 A1 | 4/2002 | Wilkins et al. |
| 2002/0060831 A1 | 5/2002 | Gerchberg |
| 2003/0179918 A1 | 9/2003 | Kohler |
| 2003/0179978 A1 | 9/2003 | Iwasaki |
| 2003/0202634 A1 | 10/2003 | Gerchberg |
| 2004/0000630 A1 | 1/2004 | Spartiotis et al. |
| 2004/0052426 A1 | 3/2004 | Landesman |
| 2004/0146196 A1 | 7/2004 | Van Heel |
| 2005/0031221 A1 | 2/2005 | Ludwig |
| 2005/0283071 A1 | 12/2005 | Ripoll et al. |
| 2006/0039532 A1 | 2/2006 | Wu et al. |

FOREIGN PATENT DOCUMENTS

| | | |
|---|---|---|
| WO | WO 99/45843 | 9/1999 |
| WO | WO 03/012382 | 2/2003 |
| WO | WO 03/012407 | 2/2003 |
| WO | WO 03/012822 | 2/2003 |
| WO | WO 03/019267 | 3/2003 |
| WO | WO 03/034010 | 4/2003 |
| WO | WO 2004/113856 | 12/2004 |
| WO | WO 2005/004188 | 1/2005 |
| WO | WO 2005/029413 | 3/2005 |
| WO | WO 2005/073689 | 8/2005 |
| WO | WO 2005/083377 | 9/2005 |
| WO | WO 2005/085936 | 9/2005 |

* cited by examiner

Object Intensity

Min=0.000299882 max=0.94637

Object Phase

Min=1.55677 max=0.70601

Probe Intensity

Min=0.000569409 max=1613.21

Probe Phase

Min=3.13988 max=3.14102

Diff. Patt. Intensity

Min=4.64114e-08 max=259.6

Diff. Patt. Phase

Min=3.14097 max=3.14125

Rec. Object Intensity

Min=0.0003 max=0.946479

Rec. Object Phase

Min=1.56661 max=0.69614

Rec. Object Intensity

Min=0 max=1

Rec. Object Phase

Min=1.5 max=0.7

Rec. Object Intensity

Min=0 max=1

Rec. Object Phase

Min=1.5 max=0.7

HIGH RESOLUTION IMAGING

CROSS REFERENCE TO RELATED APPLICATIONS

This application is the U.S. National Stage of International Application No. PCT/GB2005/001464, filed Apr. 15, 2005, which claims the benefit of Great Britain Application No. 0409572.5, filed Apr. 29, 2004. Both applications are hereby incorporated herein by reference.

TECHNICAL FIELD

The present invention relates to a method and apparatus for providing image data from which an image of a target object may be generated. The image data provides high resolution information about the structure of the target object and permits the resulting image to be of a high resolution. In particular, but not exclusively, the present invention relates to a method and apparatus for providing wavelength-limited resolution images without the need for high accuracy positioning of incident radiation, used to probe a target, relative to that target.

BACKGROUND

Many types of imaging techniques are known for deriving spatial information about a target object (or specimen). In conventional transmission imaging, an object is irradiated by plane wave illumination 10. The waves scattered by the object are re-interfered by a lens 12 to form an image, as shown in FIG. 1A. In the case of very short wavelength imaging (X-rays or electrons) this technique has many known difficulties associated with aberrations and instabilities introduced by the lens which limit the resolution and interpretability of the resulting image. Typical achievable resolution is many times larger than the theoretical wavelength limit. Conventional scanning transmission imaging is another example of such an imaging technique in which a lens is used to focus a spot of radiation through a target object. One or more detectors are located on the post target side of a target object to detect scattered radiation. Various types of detector strategies are known such as annular detectors, quadrant detectors and/or off-access detectors. However these methods rely on scanning the focused spot of radiation to all points where an image of the target object is required. There are a number of problems associated with such techniques such as the fact that very accurate control of the spot is required because if a 1000×1000 pixel image is desired a million accurate probe-position points must be used. Another problem is that the lens used must be of a very high quality. Not only is this because the resolution of the final image is only as good as the sharpness and localisation of the spot but also because with various forms of radiation such as electrons or X-rays there are many problems such as aberration effects, chromatic spread and lens current instability which can affect image production and can ruin resolution. This is shown schematically in FIG. 1B in which incident radiation 15 such as an electron or X-ray beam is incident upon a specimen 16 which forms a target object. Radiation scattered by the object exits the target object and propagates onto detector plane 17.

Known problems with conventional scanning transmission imaging are that the images take a large time to complete due to the number of points which must be probed with the incident spot of radiation. If the target object moves during data collection this can lead to inaccurate data being collected and ultimately inaccurate images being produced. Also conventional scanning transmission imaging methods do not allow information relating to the phase of the radiation exiting the target object to be measured. Only total scattering intensity at the detectors can be measured. As such phase information relating to the exit wave that emanated beyond the target object cannot be gathered.

A modification of conventional scanning transmission imaging is four-dimensional de-convolution imaging. This utilises similar apparatus to that shown in FIG. 1 but records a whole diffraction pattern for every probe position. This provides a way of determining the structure of the target object at a better resolution than the spot size or response function of the lens used but has a number of major problems. The most notable problem is that huge quantities of data must be recorded which take hours to collect for a reasonable field of view. This makes the experiment practically very difficult to carry out because it is essential to control the probing illumination very accurately and to move it accurately to scan every (million) pixel for the final image reconstruction. Also severe damage to the target object can occur because huge doses of incident radiation are required for the large times taken.

Another well known imaging technique is pure diffractive imaging. In this alternative strategy the lens may be omitted and a target object is illuminated by a simple plane wave of probing radiation. The scattering pattern measured in the far field forms a Fourier plane diffraction pattern and the intensity of this may be recorded. An iterative method is then used by applying information derived from the intensity measured to calculate an estimated object exit wave field. In order to determine real information about the target object from the estimated wave field an area in real space must be provided where it is known that the object is absent or masked in some defined way. Only by knowing this fact can a running estimate of the wave field representing the object can be iteratively altered. There are however a multitude of problems associated with pure diffractive imaging. Most notably the target object must be suspended or isolated at some fixed location in some way. This is practically very difficult to achieve. Also it is not possible to extend the solution to new or different parts of the object or get a large image all at good resolution. Only one isolated region of an object can be illuminated and solved for. Also the target object must be single valued. That is, it must be represented by a single real number. That number may represent an absorption or a phase change but may not represent both. In fact most real target object waves (that is the wave function exiting a target object) appear as complex numbers having both phase and amplitude components.

Another major problem with pure diffractive imaging is that the edge of the target object must be sharply defined and thus have a distinct edge. This is so that an area where it is known that the object is absent or masked in some way is well defined. In practice it is difficult to produce an object or aperture having such a defined edge.

Further problems are that for weakly-scattering objects, which is a common type of target object in X-ray and electron scattering, most of the radiation passing through the object ends up at the centre of the diffraction pattern. Information in this zone is wasted as it does not aid in the image forming process but the radiation passing through the object can damage the object. Also parallel illumination is required. However this means that for a source of given brightness relatively few counts are provided at the object plane. In combination with the fact that much radiation passing through weakly-scattering objects terminates in a central zone as noted above this means that the whole experiment in practice takes a long time to get enough counts. If during the data collection stage the object or some other imaging apparatus drifts or moves during exposure data may be ruined.

A method for finding this solution which has gained considerable interest is the iterative method first suggested by Gerchberg and Saxton [R. W. Gerchberg and W. O. Saxton. Optik, 35(2): 237-246, 1972]. Such iterative methods have recently been applied to the geometry illustrated in FIG. 2 for both electrons and X-rays. In this arrangement incident radiation 20 is directed at a specimen 21 which forms a target object. The target object scatters the incident radiation in a wide angular range forming a diffraction pattern at a diffraction plane 22. The diffraction pattern in the diffraction plane 22 may be recorded via any suitable method such as a photographic film or CCD detector. The experimental advantage of diffraction is that the interference condition is determined only by scattering within the target object itself, and so the grave difficulties implied by using a short wavelength lens are avoided.

SUMMARY

It is an aim of embodiments of the present invention to at least partly mitigate the above-mentioned problems.

It is a further embodiment of the present invention to provide a method and apparatus for providing image data which may be used to construct a high resolution image of a target object which utilises the advantages of iterative techniques but without the disadvantages of prior art iterative methods.

It is an aim of embodiments of the present invention to provide a method and apparatus of providing image data which may be used to construct a high resolution image of a target object without the need to use high resolution positioning techniques to position incident radiation relative to a target object or to support a target at a well defined location.

It is an aim of embodiments of the present invention to provide a method of transmission microscopy suitable for all forms of radiation which has a resolution which does not depend upon use of a lens and/or a holographic reference wave and/or any form of far-field interferometry.

It is an aim of embodiments of the present invention to provide a method and apparatus for providing image data which may be used to generate a wavelength-limited resolution image. The image may be of a part of a target object or, if the target structure is well defined, of the radiation at a selected location in the experimental path.

According to a first aspect of the present invention there is provided a method of providing image data for constructing a high resolution image of a region of a target object, comprising the steps of:

providing incident radiation, from a radiation source, at the target object;

via at least one detector, detecting the intensity of radiation scattered by said target object; and providing said image data responsive to the detected intensity without high resolution positioning of the incident radiation or a post target object aperture relative to the target object.

According to a second aspect of the present invention there is provided a method of providing image data for constructing a high resolution image of a region of a target object, comprising the steps of:

providing incident radiation, from a radiation source, at the target object;

via at least one detector, detecting the intensity of radiation scattered by said target object; and providing said image data responsive to the detected intensity via an iterative process using a movable softly varying transmittance function or illumination function.

Preferably the methods provide image data having a substantially wavelength limited resolution.

Conveniently the image data for the region of the target object is provided substantially in real time.

Advantageously the incident radiation comprises a substantially localised wave field.

According to a third aspect of the present invention there is provided a computer program product having thereon computer program code means, when said program is loaded, to make the computer execute procedure to display an image of a region of a target object on a user display, image data for generating said image being determined by the computer responsive to detected intensity measurements and calculated via an iterative process using a moveable softly varying transmittance function or illumination function.

According to a fourth aspect of the present invention there is provided an apparatus for providing image data for generating a high-resolution image of a region of a target object, comprising:

locating means for locating a target object at a predetermined location;

a radiation source for providing incident radiation at a target object located by said locating means;

at least one detector device for detecting an intensity of radiation scattered by said target object;

means for locating incident radiation or an aperture, located post target object, at one or more locations with respect to said target object; and processing means for providing said image data responsive to a detected intensity of scattered radiation.

Embodiments of the present invention use an iterative method to provide image data which may be used to construct a wavelength-limited resolution image of a region of a target object. A softly focused beam is incident at a target object or a movable aperture is positioned downstream of the object. One, two or more diffraction patterns are collected either by moving the target object or by moving the aperture so that a different region of an object exit wave function is permitted to be detected. Advantageously the aperture can be moved relatively large distances (half the aperture width or more) before scattering patterns in the positions are recorded. This means that the method of the present invention can scan large fields of view and obtain very high resolution images in real time. Alternatively rather than moving the target or aperture a pre-selected characteristic of the probe or object may be changed.

BRIEF DESCRIPTION OF THE DRAWINGS

Embodiments of the present invention will now be described hereinafter, by way of example only, with reference to the accompanying drawings in which.

In the drawings like reference numerals refer to like parts.

DETAILED DESCRIPTION

Figure 1A:
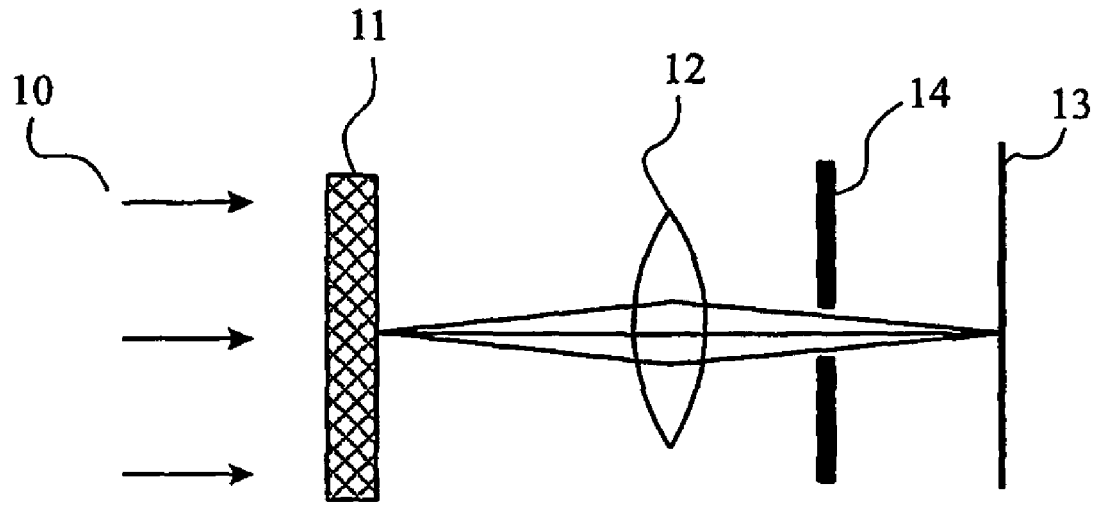
FIGS. 1A and 1B illustrate use of conventional transmission imaging and conventional scanning transmission imaging respectively.
Figure 2:
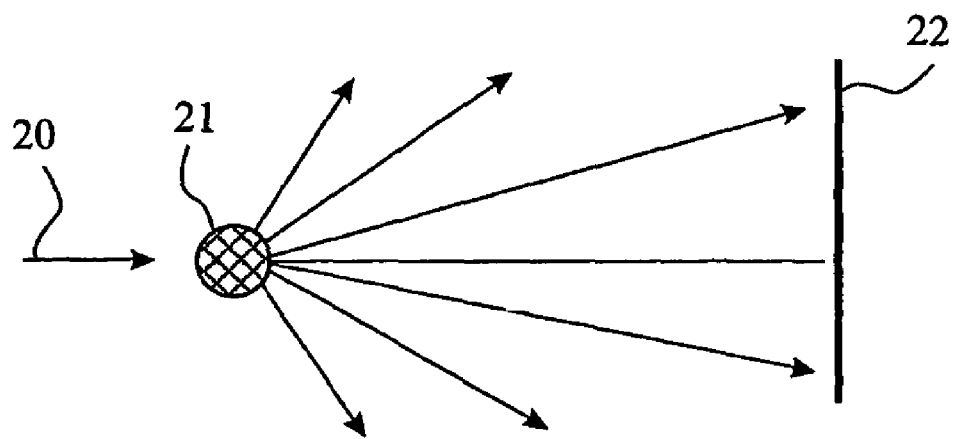
FIG. 2 illustrates how diffraction does not limit the angular range.
Figure 1B:
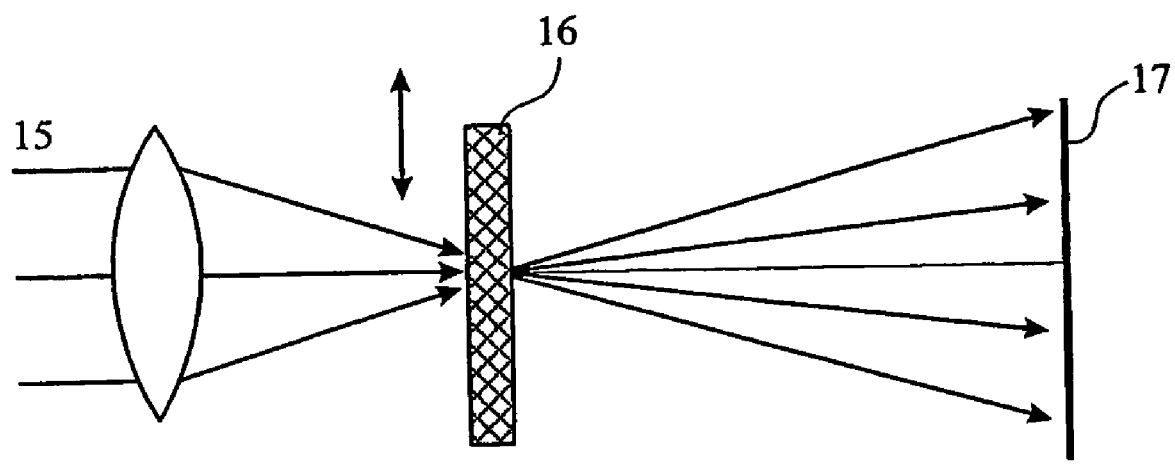
Figure 3:
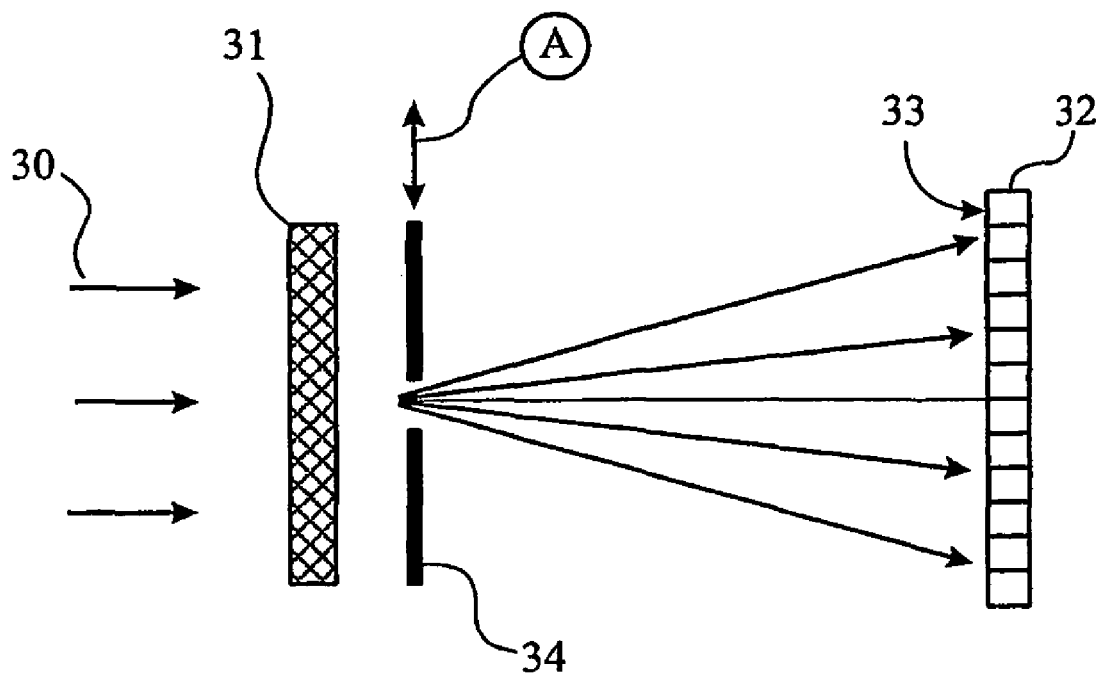
FIG. 3 illustrates how a moving aperture arrangement allows a large field of view to be measured.

FIG. 3 illustrates how a scattering pattern may be developed and used to determine high resolution information about the structure of a target object. It will be understood that the term target object refers to any specimen or item placed in the path of incident radiation which causes scattering of that radiation. It will be understood that the target object should be at least partially transparent to incident radiation. The target object may or may not have some repetitive structure.

Incident radiation 30 is caused to fall upon the target object 31. It is to be understood that the term radiation is to be broadly construed as energy from a radiation source. This will include electro magnetic radiation including X-rays, emitted particles such as electrons and/or acoustic waves. Such radiation may be represented by a wave function $\Psi(r)$. This wave function includes a real part and an imaginary part as will be understood by those skilled in the art. This may be represented by the wave functions modulus and phase. $\Psi(r)^*$ is the complex conjugate of $\Psi(r)$ and $\Psi(r) \Psi(r)^* = |\Psi(r)|^2$ where $|\Psi(r)|^2$ is an intensity which may be measured for the wave function.

The incident radiation 30 is scattered as it passes through and beyond the specimen 31. As such the wave function of the incident radiation as it exits the specimen will be modified in both amplitude and phase with respect to the wave function of the incident radiation at the pre-target side of the specimen. The scattering which occurs may include Fourier diffraction, refraction and/or Fresnel diffraction and any other form of scattering in which characteristics of the incident radiation are modified as a result of propagating after the specimen. If an array of detectors such as a CCD detector 32 is arranged a long distance from the specimen then a diffraction pattern is formed at a diffraction plane 33. A Fourier diffraction pattern will form if the detectors 32 are located a distance D from the specimen where D is sufficiently long for the diffraction pattern to be formed effectively from a point source. If the diffraction plane is formed closer to the specimen, by locating the detectors nearer, then a Fresnel diffraction pattern will be formed. An aperture 34 is located post target object to thereby select a region of the target for investigation. The aperture is formed in a mask so that the aperture defines a "support". A support is an area of a function where that function is not zero. In other words outside the support the function is zero. Outside the support the mask blocks the transmittance of radiation. Unlike prior art techniques apertures for use with the present invention need not be finite and sharply defined. They may be moveable and slowly varying at their edges. In this way the softly varying illumination function or transmittance is not composed of high spatial frequencies. In other words it is a bandwidth limited function. As no lens is used a large field of view may be measured by the detectors 32. The term aperture describes a localised transmission function of radiation. This may be represented by a complex variable in two dimensions having a modulus value between 0 and 1. An example is a mask having a physical aperture region of varying transmittance.

Figure 4:
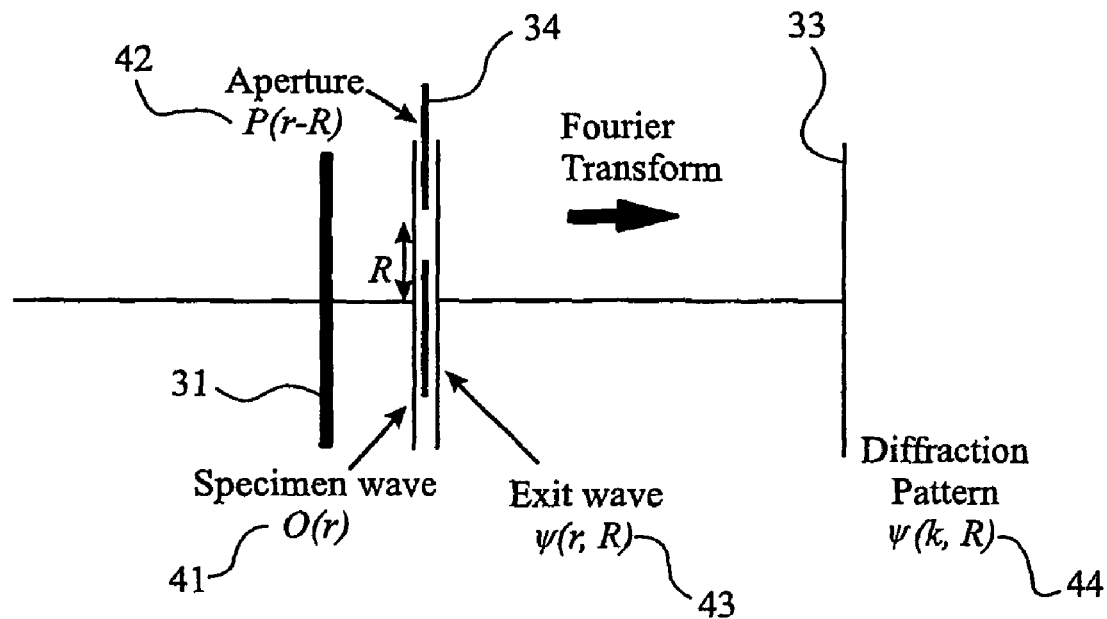
FIG. 4 illustrates moving a post-target object aperture.

FIG. 4 illustrates schematically the propagation of waves through the arrangement of FIG. 3. Incident radiation 30 falls upon the up-stream side of the specimen 31 and is scattered by the specimen as it is transmitted. A specimen wave O(r) is an exit wave function of radiation after interaction with the object 31. In this way O(r) represents a two-dimensional complex function so that each point in O(r), where r is a two-dimensional coordinate, has associated with it a complex number. O(r) will physically represent an exit wave that would emanate from the object which is illuminated by a plane wave. For example, in the case of electron scattering, O(r) would represent the phase and amplitude alteration introduced into an incident wave as a result of passing through the object of interest. The aperture 34 provides a probe function P(r) (or filtering function) which selects a part of the object exit wave function for analysis. It will be understood that rather than selecting an aperture a transmission grating or other such filtering function may be located downstream of the object function. The probe function P(r–R) is an aperture transmission function where an aperture is at a position R. The probe function can be represented as a complex function with its complex value given by a modulus and phase which represent the modulus and phase alterations introduced by the probe into a perfect plane wave incident up it.

The exit wave function $\psi(r,R)$ 43 is an exit wave function of radiation as it exits the aperture. This exit wave $\Psi(r,R)$ 43 forms a diffraction pattern $\Psi(k,R)$ 44 at a diffraction plane 33. Here r is a vector coordinate in real space and k is a vector coordinate in diffraction space.

Figure 5:
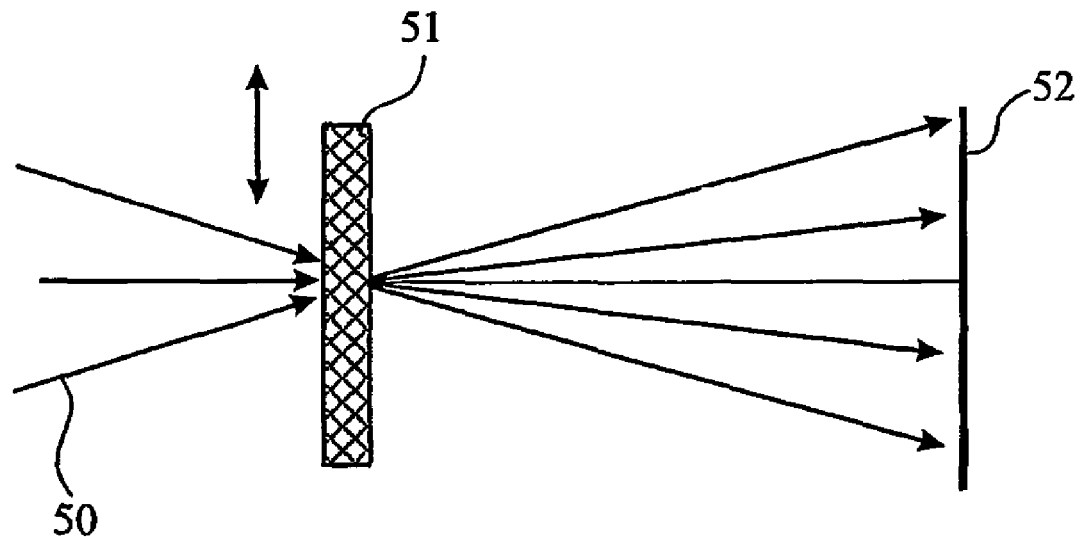
FIG. 5 illustrates how a moving focused probe allows a large field of view to be measured.

FIG. 5 illustrates a further embodiment of the present invention in which no aperture is required. In this incident radiation 50 falls upon a first surface of a target object 51. The incident radiation is scattered in the specimen and transmitted radiation propagates through to a diffraction plane 52 where a diffraction pattern forms.

Figure 6:
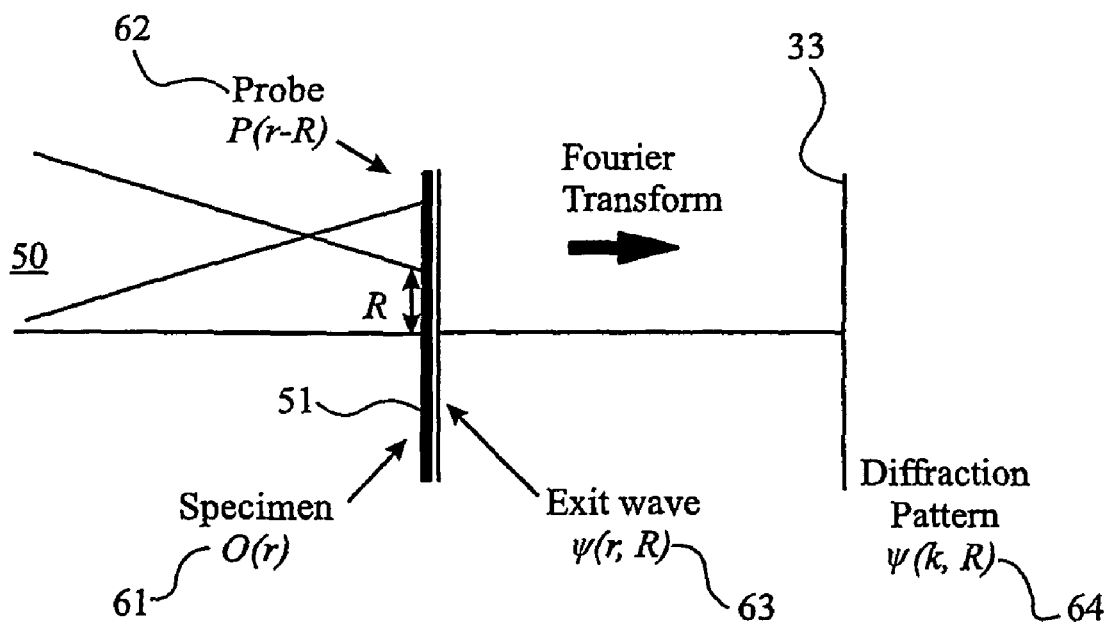
FIG. 6 illustrates a probe incident onto a target object.

FIG. 6 illustrates this process in more detail. The radiation 50 is roughly focused, for example by a weak lens, so that a region of a first surface of the target object is illuminated. The weak lens may of course comprise any appropriate focusing apparatus such as a set of plates and a voltage supply for a beam of electrons or a reflective surface for X-rays. The weak focusing is sufficient to substantially confine the probing radiation beam. It is thus not necessary to sharply focus radiation although of course strongly focussed radiation could be used. Here the target object provides an object function O(r) which represents the phase and amplitude alteration introduced into an incident wave as a result of passing through the object of interest. The illuminating radiation incident on the target object represents a probe function P(r) which forms an illumination function such as that generated by a caustic or illumination profile formed by the lens or other optical component. P(r) is the complex stationary value of this wave field calculated at the plane of the object. The exit wave function $\Psi(r,R)$ 63 defines the scattered radiation as it exits the downstream surface of the target object. As this exit wave propagates through space it will form a diffraction pattern $\Psi(k,R)$ 64 at a diffraction plane 33. It will be understood that with both the aperture formed embodiment illustrated in FIG. 4 and the non-aperture embodiment described with respect to FIG. 6 if the diffraction plane at which scattered radiation is detected is moved nearer to the specimen then Fresnel diffraction patterns will be detected rather than Fourier diffraction patterns. In such a case the propagation function from the exit wave $\Psi(r,R)$ to the diffraction pattern $\Psi(k,R)$ will be a Fresnel transform rather than a Fourier transform.

Figure 7:
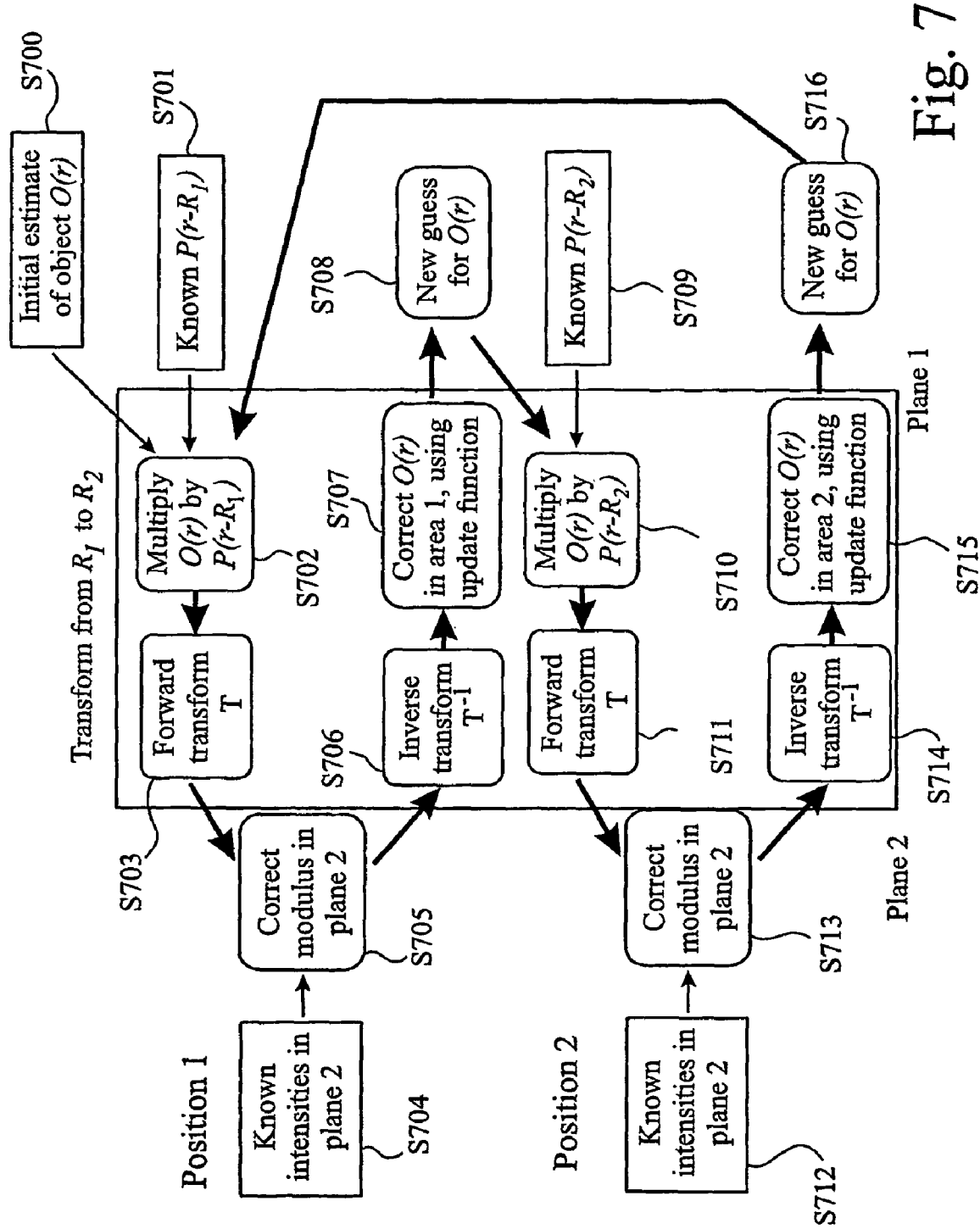
FIG. 7 illustrates a phase retrieval algorithm.

FIG. 7 illustrates an algorithm for obtaining a wave function of an object and thus for obtaining image data which may be used subsequently to generate high resolution images of an object. FIG. 7 illustrates one possible method using the first embodiment of the present invention illustrated in FIGS. 3 and 4 and moving the aperture from a first position after measuring the diffraction pattern to a second position where a second respective diffraction pattern may be measured. It will be understood that embodiments of the present invention may use one or more positions for the aperture. Also embodiments in accordance with FIGS. 5 and 6 can be used whereby rather than moving the aperture the location where the weakly focused radiation falls on the specimen may be selected.

As noted above O(r) and P(r) represent two-dimensional complex functions, that is, each point in O(r) or P(r), where r is a two-dimensional coordinate, has associated with it a complex number. In what follows, O(r) will physically represent an exit wave that would emanate from an object function which is illuminated by a plane wave. For example, in the case of electron scattering, O(r) would represent the phase and amplitude alteration into an incident wave as a result of passing through the object of interest.

In what follows P(r) represents either an illumination function, such as that generated by a caustic or illumination profile formed by a lens or other optical component (e.g. as shown in FIGS. 5 and 6, it being understood that P(r) is the complex stationary value of this wavefield calculated at the plane of the object function) or a filtering function, such as an aperture or transmission grating mounted downstream of the object function (as shown in FIGS. 3 and 4).

It may be assumed in what follows that O(r) or P(r) can be moved relative to one another by various distances R. The nomenclature adopted is written in terms of moving P(r), although equivalently we could instead move O(r) relative to P(r). In both situations, the complex value of O(r) is altered by forming the product of O(r) with P(r−R) to give a total exit wave function of ψ(r), i.e.

$$\psi(r,R)=O(r)P(r-R) \qquad 1$$

This will generally be satisfied. It is notable that there are very few practical restrictions on either the object function or the probe/aperture function. Neither function may be a plane wave, or periodic with a repeat distance that is a multiple of the difference between different values for R. This is because the algorithm requires several measurements that are different in order to work. In experimental practice these criteria are easy to satisfy.

The algorithm works to find the phase and intensity of the complex function ψ(r,R). It requires as input knowledge of the function P(r−R), and one or more (preferably several) measurements of the intensity of the wave function in a plane which is different to that containing the specimen. It is convenient to use the diffraction plane, which is related to the specimen plane by the Fourier transform. In this case the measured input data is the intensities of the diffraction patterns at one or more probe/aperture positions. Using diffraction data has several advantages, including ease of collection, no requirements for focusing the exit wave function into an image, and the increase of resolution achieved by measuring data at high angles.

However it is also possible to run the algorithm based on a set of defocused images measured at some distance from the exit surface of the specimen/aperture. In this situation the free space propagator is substituted for the Fourier transform.

The algorithm is not restricted to use of these two transforms. Other effective transforms could be used to move from one plane of information to the other. In what follows a general transform T is referred to that transforms a wave function from the first plane, called plane 1, to the second plane, called plane 2.

The algorithm works as follows and with reference to FIG. 7:

1. Start at step S700 with a guess at the object function $O_{g,n}(r)$, where the subscript g,n represents a guessed wave at the nth iteration of the algorithm. These functions are in plane 1 (which is the real space plane if the Fourier transform is used). Preferably the first guess of $O_{g,n}(r)$ equals unity at all points r. This corresponds to an absent specimen.

2. A known aperture in terms of position and characteristics is selected at step S701. This provides a probe function P(r−R). At step S702 the current guess at the object function is multiplied by the aperture or probe at the current position R, P(r−R). This produces the guessed exit wave function (still in plane 1) for position R, $$\psi_{g,n}(r,R)=O_{g,n}(r)P(r-R) \qquad 2$$

3. Next at step S703 a transformation of $\psi_{g,n}(r,R)$ to obtain the corresponding wave function in plane 2 (which would be the diffraction space plane if the Fourier transform is used), for that position R. Here T is used to represent some general transform that would often be the Fourier transform, but could also be the Fresnel free space propagator, or some other transform suited to a particular application of the algorithm.

$$\Psi_{g,n}(k,R)=T[\psi_{g,n}(r,R)] \qquad 3$$

k is the coordinate in plane 2. (For the Fourier transform, k would be the usual reciprocal space coordinate. For the propagator, k would be the xy coordinate in the defocused plane.) It is important to note that $\Psi_{g,n}(k,R)$ is a "guessed" version of the actual wave function in plane 2, since it has been produced by the guessed object function $O_{g,n}(r)$. Successive iterations of the algorithm will produce increasingly accurate versions of $\Psi_{g,n}(k,R)$.

Note that $\Psi_{g,n}(k,R)$ can be written in the form:

$$\Psi_{g,n}(k,R)=|\Psi_{g,n}(k,R)|e^{i\theta_{g,n}(k,R)} \qquad 4$$

where $|\Psi_{g,n}(k,R)|$ is the (guessed) wave function amplitude and $\theta_{g,n}(k,R)$ is the (guessed) phase in plane 2 at iteration n, for position R.

By measuring the intensity of the diffraction pattern by known techniques such as detector array 32 information about the actual transformed exit wave function are known. A measured intensity of the diffraction pattern where the aperture is in a first position thus forms the basis of an estimate of the complex wave function of the diffraction pattern. However the measured intensity does not provide information about the phase of the wave function. Rather the measured intensity is comparable to the squared modulus of Ψ(r). That is $|\Psi(r)|^2$. Once the intensity of radiation in the diffraction pattern in plane 2 is known at step S704 then the following step may be carried out.

4. Correct, at step S705 the intensities of the guessed plane 2 wave function to the known values.

$$\Psi_{c,n}(k,R)=|\Psi(k,R)|e^{i\theta_{g,n}(k,R)} \qquad 5$$

where $|\Psi(k,R)|$ is the known plane 2 modulus. That is the square root of the measured intensity at the image plane.

5. Inverse transform S706 back to real space to obtain a new and improved guess at the exit wave function (in plane 1) ($T^{-1}$ represents the inverse of the previously used transform T), $$\psi_{c,n}(r,R) = T^{-1}[\Psi_{c,n}(k,R)] \qquad 6$$

6. Update via step S707 the guessed object wave function in the area covered by the aperture or probe, using the update function $$O_{g,n+1}(r) = \qquad 7$$
$$O_{g,n}(r) + \frac{|P(r-R)|^\ell P*(r-R)}{|P_{max}(r-R)|^\ell (|P(r-R)|^2 + \delta)} \beta(\psi_{c,n}(r,R) - \psi_{g,n}(r,R))$$

where the parameters $\beta$, $\delta$ and $l$ are appropriately chosen, and $|P_{max}(r-R)|$ is the maximum value of the amplitude of P(r). The result is a new guess for the object function (S708).

The update function helps make the effective deconvolution that occurs possible and introduces a weighting factor which causes the object function to be updated most strongly where the probe function has largest amplitude. The selectable constant l may be set to 1. It may be selected as any value in the range of 0 to 3 and need not be an integer value. It is useful to set l>1 when there is much noise. l may be selected l<1 when because of scattering geometry, the detected intensity is of the form of a Gabor hologram or similar. The value $\delta$ is used to prevent a divide-by-zero occurring if |P(r−R)|=0. $\delta$ is a small real number as is commonly applied in Weiner Filters and is usually (though not necessarily) smaller than $P_{max}$ and can be considerably smaller if the noise present in the recorded data is small. The constant $\beta$ controls the amount of feedback in the algorithm, and may advantageously be varied between roughly 0.1 and 1. When $\beta$=less than 0.5, the previous estimate of the object is considered to be more important than the new estimate. Values in between vary the relative importance of the two estimates. $\beta$ determines how quickly a solution is reached.

$\delta$ is a parameter which may be set at a fixed value or which may vary. It indicates how noisy the recorded data is and is used to attenuate how the updating is carried out in response to these circumstances. If good conditions exist for data collection that is to say with high beam current (high flux), which would imply low shot-noise, then it is safer to use results gathered to update the guessed estimate. Consequently the value of $\delta$ can be a small fraction of $P_{max}$ (e.g. less than $\frac{1}{10}^{th}$).

The expression:

$$\frac{|P(r-R)|^\ell}{|P_{max}(r-R)|^\ell} \qquad 8$$

maximises the update effect of regions where |P(r−R)| is large. This is useful, since it is those regions which are receiving the highest amount of incident radiation, and therefore which contain information with a relatively high signal to noise ratio. This information is clearly more valuable than that from regions where very little radiation is incident, and which is heavily affected by noise.

For the situation where $\beta$=1, l=0 and $\delta$=0, and the function P(r−R) is a mask that is can be represented by a region where its value is unity while it is zero elsewhere, or support function, the algorithm has some similarities to the well known Fienup algorithm. If in this situation, only one position R is used, then the algorithm reduces to being mathematically identical to the basic Fienup algorithm. Where more than one position R is used, the algorithm has considerable advantages over known methods, including the fact that it does not suffer from uniqueness issues, and that a wider field of view may be imaged.

Subsequent to updating the running estimate of the guess the algorithm shown in FIG. 7 progresses to selecting a new position R which at least in part overlaps the previous position. The overlap should preferably be more than 20% and is preferably 50% or more. This may be achieved by either moving the aperture in the direction of arrow A shown in FIG. 3 by a predetermined amount or by causing the illuminating radiation shown in FIG. 5 to fall upon a different region of the target. It will be understood that embodiments of the present invention may successfully provide image data for one location of a target object without any change in location of an aperture or incident radiation being made. In such embodiments after step S708 the algorithm returns to step S702. Instead of the initial estimate of the object function O(r) being loaded in the new guess for O(r) of step S708 is loaded in. On each iteration the new guess for the object function will approximate closer and closer to the actual object function as on each iteration information of the known intensity and thus the known amplitude component of the incident radiation is added to improve the accuracy of the estimate.

Nevertheless the more preferable method is to move to a new position R which in part overlaps the previous position as shown in FIG. 7.

A known probe function $P(r-R_2)$ at the second position is identified at step S709 and then the step as above mentioned are repeated so that the new guess generated in step S708 is multiplied with the new known probe function identified at step S709. This is illustrated in step S710. Effectively this generates an exit wave function either post specimen or post aperture depending upon the embodiment concerned. The resulting exit wave function is propagated at step S711 to provide an estimate of the scattering pattern which should be detected at that position. The diffraction pattern is measured at step S712 which provides intensity information and thus amplitude information about the transformed wave function. The intensity information is used to correct the amplitude of the transformed wave function whilst phase information is retained at step S713. This corrected wave function is inversely propagated via Fourier transformation (when the image is formed in the far field), Fresnel transformation when the image is formed at a location where Fresnel diffraction dominates or by any other suitable transformation. This is illustrated at step S714. The running estimate of O(r) is then corrected according to the update function shown above at step S715 and the result is a new guess for the object function illustrated in step S716.

At this stage further movement of the illumination or aperture may be made to a third or further position. Again a location where some overlap occurs between previous illuminated locations is preferable. In this way the whole target object may optionally be mapped. Alternatively the new guess generated at step S716 may be repeated without further positioning knowing known diffraction pattern results. In FIG. 7 the iterative method is illustrated as being repeated by returning to step S702 in which the new guess generated at step S716 is input to the multiplication stage rather than the initial estimate of the object function supplied at step S700.

The iterative method may be repeated until a predetermined event occurs. For example the iteration may be repeated a predetermined number of times, for example 1000 times or until the sum squared error (SSE) is sufficiently small. The SSE is measured in plane 2, as $$SSE = \frac{(|\psi_{g,n}(k, R)|^2 - |\psi(k, R)|^2)^2}{N} \quad 9$$

where N is the number of pixels in the array representing the wave function.

During the iteration process the most up-to-date guess of the object function provides a running estimate for that object function. When the iteration process is completed as determined by the occurrence of a predetermined event, the running estimate of the object function provides image data at the locations which are either illuminated by the incident radiation or which are selected by location of a post target object aperture. This image data includes amplitude and phase information which can subsequently be used to generate a high resolution image of the selected region of the target object.

The moving probe algorithm has been used to recover the phase of the wave function created when a STEM probe is incident onto an object with the transmission function shown in the first row. This transmission was created by taking an image measured with a CDD camera of gold particles on an amorphous carbon background, treating that image as an amplitude object only, and propagating the result by 1000 Å, to obtain the intensity and phase shown.

Figure 8:
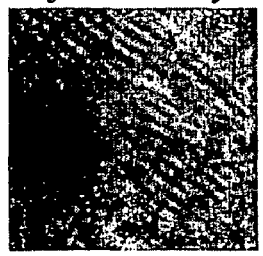
FIG. 8 illustrates intensity and phase results.
Figure 8:
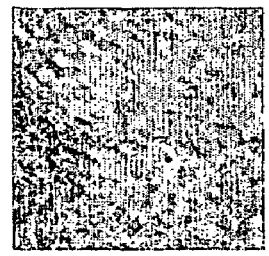
Figure 8:
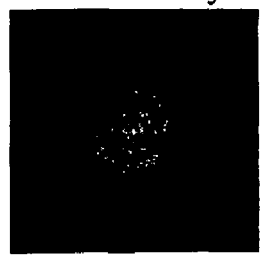
Figure 8:
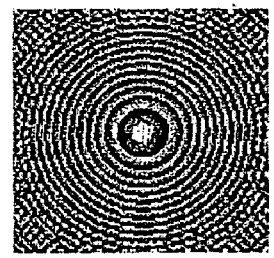
Figure 8:
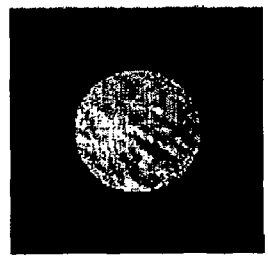
Figure 8:
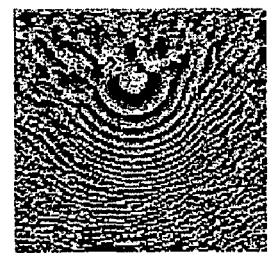
Figure 8:
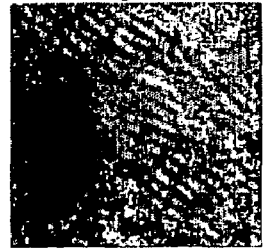
Figure 8:
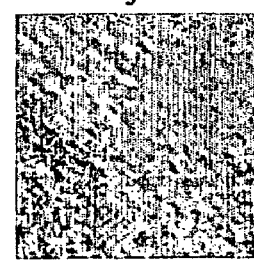

The STEM probe has an aperture size 0.25 Å$^{-1}$, defocus 3000 A, and a total number of counts of $1.0 \times 10^6$. This results in the intensity and phase shown in FIG. 8. This probe is to be multiplied with the object transmission function, for several different probe positions in a 128×128 pixel array. The resulting wave functions are Fourier transformed to obtain diffraction patterns such as that shown in the third row of FIG. 8, which is the diffraction pattern for the probe position (60,40).

Figure 9:
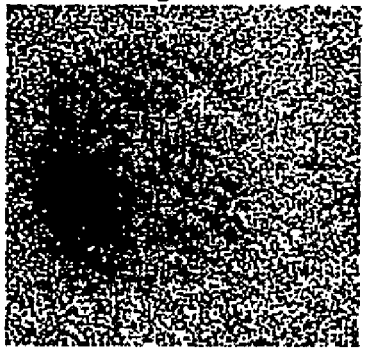
FIG. 9 illustrates further intensity and phase results with noise added.
Figure 9:
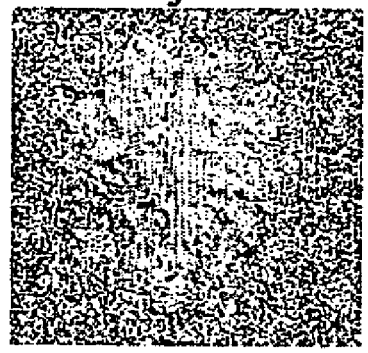
Figure 9:
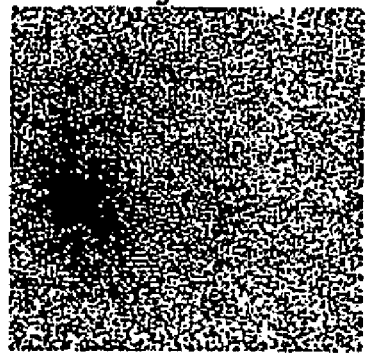
Figure 9:
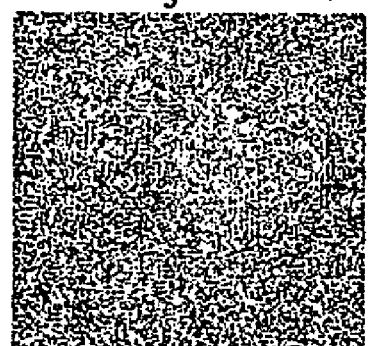

The algorithm was run, with parameters from equation 7 of $\beta=1$, $l=1$ and $\delta=0.0001$, for 2000 iterations, at which point the SSE in diffraction space was $1.444 \times 10^{-7}$, and still decreasing quickly. The recovered wave function at this stage is shown in the fourth row of FIG. 8. Clearly the algorithm works very well. The same experiment was repeated twice more with the inclusion of added Poisson noise, with a mean value of first 1.0, and secondly 5.0. The value of $\beta$ was modified to $\beta=0.6$, which resulted in an improved convergence. The results of these simulations are shown in FIG. 9. Clearly the addition of noise has an effect on the algorithm. It is particularly clear that the object transmission function is only effectively recovered in the vicinity of the set of probe positions used for that retrieval. This is the expected behaviour as very little is known about the object in regions where the probe is vanishingly small. The results shown have been scaled to the same greyscale as the original object transmission function. It is clear that the structure and some of the detail of the object are recovered, even in the case where the noise is relatively high.

Embodiments of the present invention thus provide a new method of phase retrieval which is applicable to many situations in microscopy with particular emphasis on its applicability to scanning transmission electron microscopes. The method required as input intensity information only measurements from a small number (one or more) of different probe or aperture positions and this therefore removes the need for post-specimen lenses thus avoiding the problems associated with aberrations of such lenses. The algorithm employed converges rapidly to retrieve the phase of the object transmission function.

This enables high resolution images illustrating the structure of target objects to be generated in real time. The algorithm is also effective in noisy situations and works for a very wide variety of different objects and probe functions. Embodiments of the present invention also enable probe functions to be calculated when target objects having a predetermined structure are used.

Figure 10A:
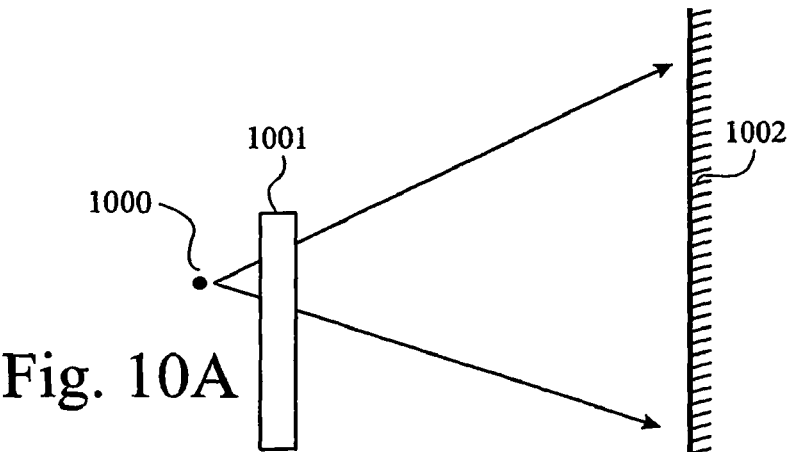
FIGS. 10A, 10B and 10C illustrate alternative ways in which radiation may be provided at a target object.
Figure 10B:
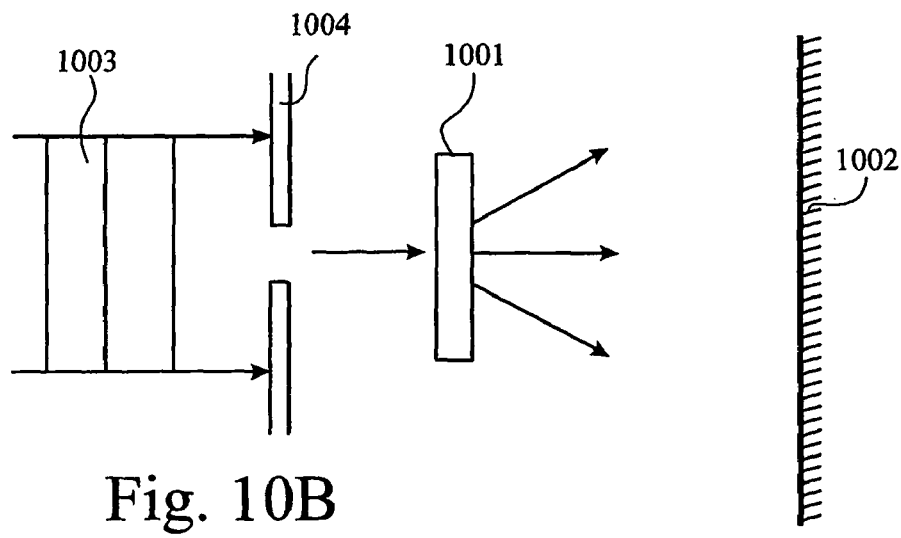
Figure 10C:
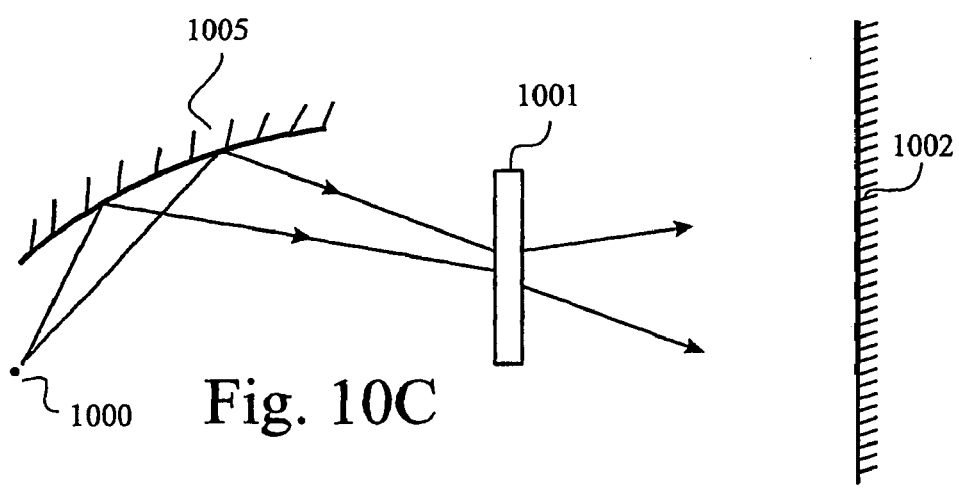

FIGS. 10A, 10B and 10C illustrate alternative embodiments of the present invention and in particular show how incident radiation at a target may be generated and data identifying aspects of radiation scattered from the target may be detected. FIG. 10A illustrates how a source of radiation 1000 which may be located close to a target 1001 can be used to form a scattering pattern on an array of detectors 1002. The source should be sufficiently close to the target object to ensure that the illuminated area of the target object is sufficiently small so that the Nyquist sampling condition in the detector plane is satisfied. This embodiment needs no lenses or apertures in order to provide image data from which high-resolution images of the target 1001 may be generated. It is however important under these particular conditions to locate the source 1000 sufficiently close to the upstream surface of the target 1001 to achieve this resolution. In order to provide more than one position for the update process the specimen or the source may be moveable.

FIG. 10B illustrates a further embodiment of the present invention in which a source of plane wave radiation 1003 is caused to fall on a focusing tube 1004. The tube 1004 selects a region of the radiation 1003 which is allowed to pass and becomes incident radiation at the target 1001. No lenses or post target apertures are required in accordance with this particular embodiment.

FIG. 10C illustrates a still further embodiment in which a point source 1000 of radiation emits radiation which falls on a low-angle mirror 1005 or some other reflective surface. Such a reflective surface is particularly applicable when the point source 1000 is a source of X-rays. The radiation is reflected by the mirror 1005 at close to grazing angles and is incident on the target 1001. Again scattered radiation is detected by the array of detectors 1002.

Figure 11A:
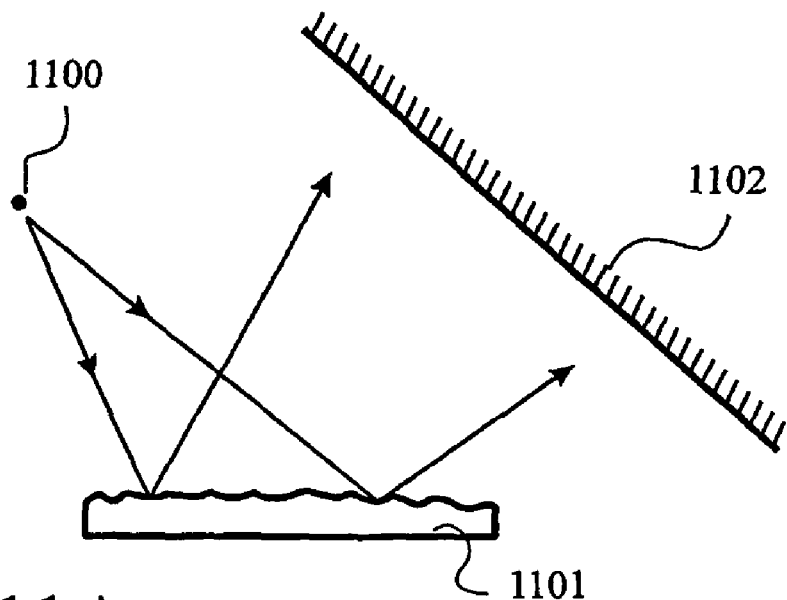
FIGS. 11A and 11B illustrate how embodiments of the present invention can provide a surface profilometer.
Figure 11B:
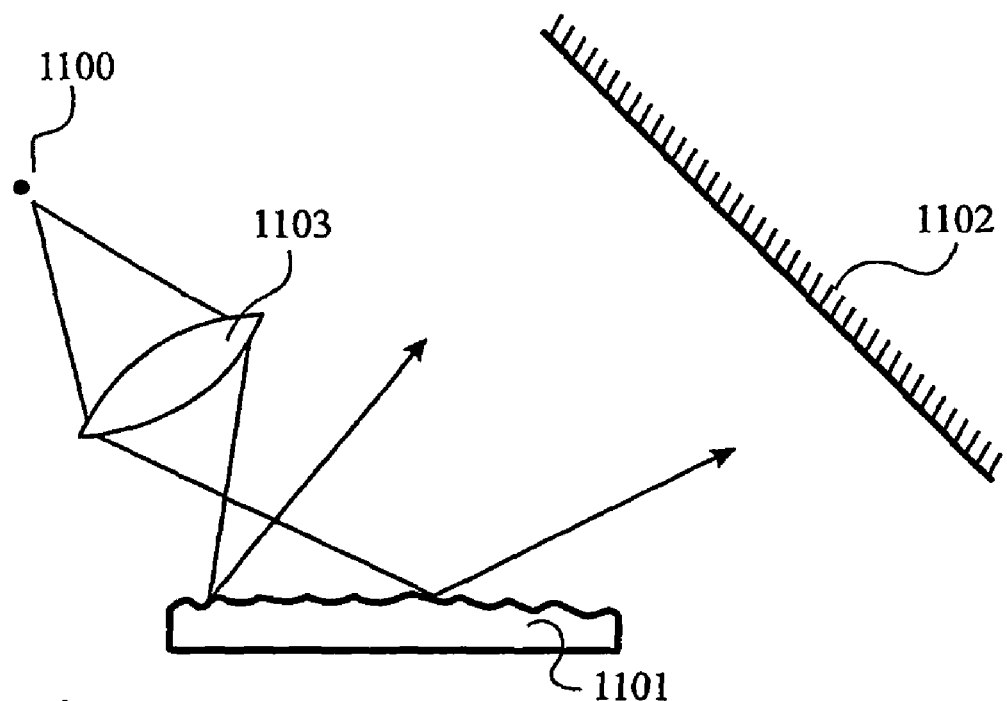

FIGS. 11A and 11B illustrate still further embodiments of the present invention. In particular they illustrate how embodiments of the present invention can be applied to provide a surface profilometer. A point source 1100 radiates radiation which falls upon a surface of a target specimen 1101. Rather than being transmitted through the specimen as above-described this specimen is either wholly or partly reflective. Bumps and other surface features cause a change of phase in the incident radiation and this radiation reflected from the target is scattered to an array of detectors 1102 where the scattering pattern may be detected as above described. FIG. 11B illustrates an alternative embodiment for the surface profilometer in which radiation from the source 1100 is first focused by a lens 1103 prior to interaction with the target object 1101. It will be understood that the algorithm above-described is applicable equally to the transmittance mode described above and the reflective embodiments described with respect to FIG. 11. In each of the various embodiments described in FIGS. 10 and 11 movement of the source 1000, 1100, target 1001, tube 1004 and/or reflective mirror 1005 can be used to reposition an illumination function or probe function for use in a next iteration in the algorithm above-described.

Figure 12:
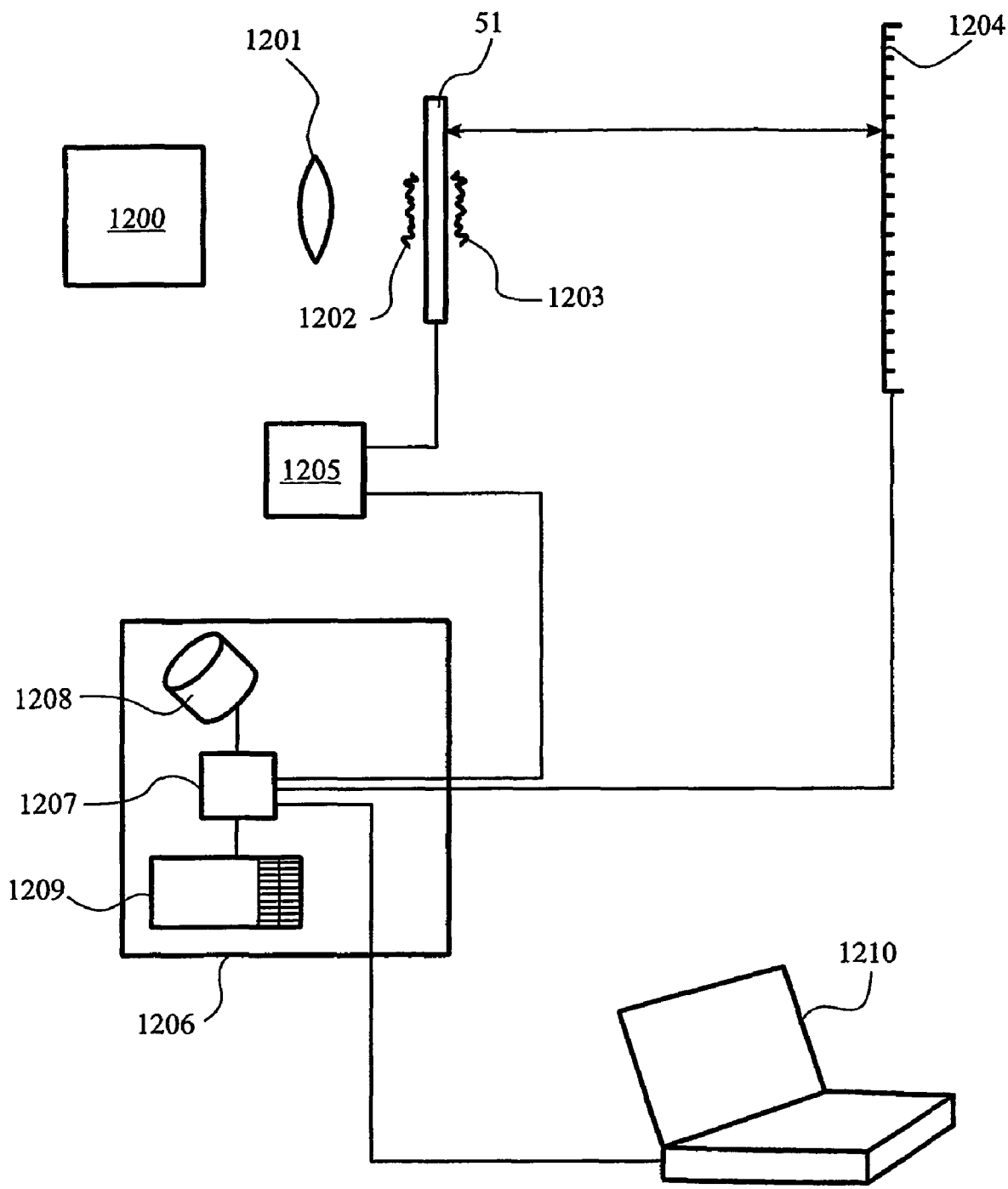
FIG. 12 illustrates apparatus for providing image data.

FIG. 12 illustrates apparatus for providing image data which may be used to construct a high-resolution image of a region of a target object according to the above-described embodiment illustrated in FIGS. 5 and 6. A source of radiation 1200 provides illumination onto a lens 1201 which weakly focuses the radiation onto a selected region of a target 51. The incident radiation has an incident wave function 1202 and an exit wave function 1203. This exit wave function is propagated across distance D where a diffraction pattern is formed on an array of detectors 1204. The distance D is advantageously sufficiently long so that the propagated exit wave function 1203 forms a Fourier diffraction pattern in the far-field. The detector array provides at least one detector which can detect the intensity of radiation scattered by the target object 51. A locating device 1205 is provided which may be a micro actuator and this can locate the target object at one or more locations as desired with respect to the target object. In this way radiation from source 1200 may be made incident on different locations of the upstream surface of the target 51.

A control unit 1206 provides control signals to the micro actuator and also receives intensity measurement results from each of the pixel detectors in the detector array 1204. The control unit 1206 includes a microprocessor 1207 and a data store 1208 together with a user interface 1209 which may include a user display and a user input key pad. The control unit may be connected to a further processing device such as a laptop 1210 or PC for remote control. Alternatively it will be understood that the control unit 1206 could be provided by a laptop or PC. The control unit 1206 can automatically control the production of image data in real time. Alternatively a user can use the user interface 1209 to select areas of the target object for imaging or provide further user input.

In use the source of radiation 1200 illuminates the lens 1200 with radiation. The target object 1200 is selectively located by the actuator 1205 under control of the control unit 1206. The radiation forms a diffraction pattern detected at respective locations by each of the detectors in the detector array 1204. Results from these detectors is input to the control unit and may be stored in the data store 1208. If only one position is being used to derive image data the microprocessor uses this detected information together with program instructions including information about the algorithm above-noted to derive the image data. However if one or more further positions are required prior to finalising the image data the control unit next issues signals to the actuator 1205 which locates the specimen at another selected location. The actuator 1205 may place the specimen at one of many different positions. After relocation a further diffraction pattern formed on the detector array is measured and the results stored in the control unit. As an example the array 1204 may be a CCD array of 1200×1200 pixels. If no further intensity measurements are required image data may at this stage be generated by the control unit in accordance with the two newly stored sets of results using the algorithm above-noted. The raw image data may be displayed or a high-resolution image generated from the image data may be displayed on the user interface 1209 or remote display on a PC or other such device.

Embodiments of the present invention thus provide an iterative method for deriving image data of a target object. The iterative method is applicable in an intelligent way so as to be able to cope with generalised illumination systems. In these the transmittance function of an aperture is weakly defined or a beam of radiation may be weakly focused. In alternative embodiments rather than deriving information of an object, if the object is well known, information regarding the radiation or aperture itself may be derived.

Embodiments of the present invention provide a method for obtaining image data suitable for subsequently generating a high resolution image of a part of a specimen at wave length-limited resolution. In this way a method and apparatus is provided which can produce image data having a far higher resolution than the resolution required for positioning accuracy of apparatus used to derive that information. In the case of very short wavelength radiation (sub-atomic) the resolution improvement may be 40 or more relative to prior art techniques. In some instances the resolution will be compromised by the atomic motions themselves.

Embodiments of the present invention have been described hereinabove by way of example only. It will be appreciated by those skilled in the art that variations and modifications may be made to the specific examples disclosed without departing from the scope of the present invention.

The invention claimed is:

1. A method of providing image data for constructing an image of a region of a target object, comprising the acts of:
   providing incident radiation, from a radiation source, at the target object;
   via at least one detector, detecting the intensity of radiation scattered by said target object with a post target object aperture or the incident radiation at a first position with respect to the target object;
   re-positioning the aperture or incident radiation relative to the target object;
   subsequently detecting the intensity of radiation scattered by said target object with the aperture or incident radiation at a second position with respect to the target object; and
   responsive to at least the detected intensity at said first and second positions, providing said image data via an iterative process and using a softly varying transmittance function or illumination function.

2. The method as claimed in claim 1 wherein said act of providing said image data comprises the acts of:
   estimating an object function indicating at least one characteristic of said region of the target object; and
   iteratively re-estimating said object function, whereby an accuracy of a running estimate of the object function is improved with each iteration.

3. The method as claimed in claim 2 further comprising the acts of:
   multiplying the estimated object function by a probe function indicating at least one characteristic of the incident radiation at said target object;
   providing an exit wave function responsive to a result of said multiplication;
   propagating the exit wave function to provide an estimate of an expected scattering pattern; and
   correcting at least one characteristic of said expected scattering pattern according to a detected intensity.

4. The method as claimed in claim 3 further comprising the acts of:
   inverse propagating the corrected expected scattering pattern to provide an updated exit wave function; and
   updating the running estimate of the object function responsive to said updated exit wave function according to the function:

$$O_{g,n+1}(r) = O_{g,n}(r) + U(r)(\Psi_{c,n}(r,R) - \Psi_{g,n}(r,R))$$

where $O_{g,n+1}(r)$ is a running estimate of the object function $O_{g,n}(r)$ is a preceding estimate of the object function or is unity when there is no preceding estimate, $U(r)$ represents an update function, $\Psi_{c,n}(r,R)$ is a corrected guess at an exit wave function and $\Psi_{g,n}(r,R)$ is the current guessed exit wave function for an iteration.

5. The method as claimed in claim 4 wherein said update function U(r) is:

$$U(r) = \frac{\beta |P(r-R)|^{\ell} P*(r-R)}{|P_{max}(r-R)|^{\ell}(|P(r-R)|^2 + \delta)}$$

where β is a feedback constant, P(r–R) is a probe function at a position R, P*(r–R) is a conjugate of the probe function P(r–R), $P_{max}$(r–R) is the maximum value of the amplitude of P(r), δ is a selectable parameter and l is a selectable parameter.

6. The method as claimed in claim 4 wherein said inverse propagation is calculated according to:

$$\psi c, n(r, R) = \mathcal{T}^{-1}[\Psi_{c,n}(k, R)]$$

where $\psi_{c,n}$(r,R) is a guessed wave function in a first plane, $\mathcal{T}^{-1}$ illustrates an inverse transformation procedure and $\Psi_{c,n}$(k,R) is a corrected wave function in a second plane.

7. The method as claimed in claim 3 wherein said act of propagating comprises a Fourier transformation when the detected intensity is detected at the far field.

8. The method as claimed in claim 3 wherein said act of propagating is a Fresnel propagation when the at least one detector is at a distance from said target object where Fresnel diffraction dominates.

9. The method as claimed in claim 3 wherein said corrected expected scattering pattern is corrected according to:

$$\Psi_{c,n}(k, R) = |\Psi(k, R)|e^{i\theta_{g,n}(k,R)}$$

where $\Psi_{c,n}$(k,R) is a corrected wave function, |Ψ(k,R)| is the known amplitude in a second plane and $\theta_{g,n}$(k,R) is the guessed phase in the second plane.

10. The method as claimed in claim 3 wherein propagation is calculated according to:

$$\Psi_{g,n}(k, R) = \mathcal{T}[\psi_{g,n}(r, R)]$$

where $\Psi_{g,n}$(k,R) is a guessed wave function in a second plane, $\mathcal{T}$ indicates a transformation and $\psi_{g,n}$(r,R) is a guessed wave function in a first plane.

11. The method as claimed in claim 2 wherein said at least one characteristic comprises amplitude, phase, or both amplitude and phase.

12. The method as claimed in claim 1 wherein said act of providing said image data comprises the acts of:
estimating an object function indicating at least one characteristic of a post-target object wave function immediately before a post-target object aperture; and
iteratively re-estimating said object function, whereby an accuracy of a running estimate of the object function is improving with each iteration.

13. The method as claimed in claim 12 further comprising the acts of:
multiplying the estimated object function by a probe function indicating at least one characteristic of a post-target object aperture;
providing an exit wave function responsive to a result of said multiplication;
propagating the exit wave function to provide an estimate of an expected scattering pattern; and
correcting at least one characteristic of said expected scattering pattern according to a detected intensity.

14. The method as claimed in claim 12 wherein said at least one characteristic comprises amplitude, phase, or both amplitude and phase.

15. The method as claimed in claim 1, further comprising the act of selecting said second position so that an area determined in said first position overlaps with a further area determined in said second position.

16. The method as claimed in claim 15 wherein said further area overlaps at least 20% of said an area.

17. The method as claimed in claim 15 wherein said further area overlaps more than 50% of said an area.

18. The method as claimed in claim 1 further comprising the act of terminating the iteration process when a predetermined event occurs.

19. The method as claimed in claim 18 wherein said predetermined event comprises the number of iterations satisfying a predetermined condition.

20. The method as claimed in claim 18 wherein said predetermined event comprises a sum squared error satisfying a predetermined condition.

21. The method as claimed in claim 1, further comprising the act of positioning the incident radiation with respect to the target object by selecting a location where the incident radiation falls on the target object.

22. The method as claimed in claim 21, further comprising the act of selecting the location where the incident radiation falls on the target object by forming an illumination profile with a lens or other optical component.

23. The method as claimed in claim 1 wherein said incident radiation comprises a substantially localized wave field.

24. The method as claimed in claim 1 wherein said image data has a substantially wavelength-limited resolution.

25. The method as claimed in claim 1 wherein said at least one detector comprises two or more detectors.

26. The method as claimed in claim 1, further comprising the act of providing said image data for the region of said target object in real time.

27. The method as claimed in claim 1 further comprising the act of generating the image of said region on a user display based upon said image data.

28. The method as claimed in claim 1, further comprising the act of providing said incident radiation at said target object via a weak lens or a caustic from a reflective surface.

29. The method as claimed in claim 1 further comprising the act of locating each said at least one detector in the far field with respect to said target object.

30. The method as claimed in claim 1 further comprising the act of locating each said at least one detector at a distance from said target object where Fresnel diffraction dominates.

31. The method as claimed in claim 1 wherein said radiation is scattered via Fourier diffraction, Fresnel diffraction, or both Fourier diffraction and Fresnel diffraction.

32. A computer program product having thereon computer program code means, when said program is loaded, to make the computer execute procedure to display an image of a region of a target object on a user display, image data for generating said image being determined by the computer in accordance with a method as claimed in claim 1.

33. The method as claimed in claim 1, wherein the target object is at least partially transparent to the incident radiation and detecting an intensity of radiation scattered by the target object comprises detecting an intensity of radiation transmitted by the target object.

34. The method as claimed in claim 1, wherein the target object is at least partially reflective to the incident radiation and detecting an intensity of radiation scattered by the target object comprises detecting an intensity of radiation reflected by the target object.

35. A computer-readable storage device having stored thereon program instructions for causing a computer to perform a method, the method comprising:
- via at least one detector, detecting intensity of radiation scattered by a target object with a post target object aperture or the incident radiation at a first position with respect to the target object;
- subsequently detecting the intensity of radiation scattered by said target object with the aperture or incident radiation at a second position with respect to the target object; and
- responsive to at least the detected intensity at said first and second positions, generating image data via an iterative process and using a softly varying transmittance function or illumination function.

36. Apparatus for providing image data for generating an image of a region of a target object, comprising:
- locating means that locates a target object at a predetermined location;
- a radiation source for providing incident radiation at a target object located by said locating means;
- at least one detector device for detecting an intensity of radiation scattered by said target object;
- locating means that locates incident radiation or an aperture, located post target object, at two or more locations with respect to said target object; and
- processing means that responsive to a detected intensity of scattered radiation at the two or more locations provides said image data via an iterative method and using a softly varying transmittance function or illumination function.

37. The apparatus as claimed in claim 36, further comprising a lens or optical component that forms an illumination profile determining said illumination function.

38. The apparatus as claimed in claim 36, wherein said processing means comprises:
- a microprocessor;
- a data store that holds data and instructions for said microprocessor; and
- means that provides instructions to move one of said incident radiation or said aperture or a located target object.

39. The apparatus as claimed in claim 36 wherein said processing means further comprises:
- a user interface comprising a user input device for enabling a user to input data, and a user display for displaying said image data or a high resolution image generated from said image data.

40. The apparatus as claimed in claim 36 wherein said radiation source comprises a source of coherent radiation.

41. The apparatus as claimed in claim 36 wherein said radiation source comprises a source of incoherent radiation.

42. The apparatus as claimed in claim 36 wherein said radiation source is an electron beam generator.

43. The apparatus as claimed in claim 36 wherein said radiation source is an X-ray beam generator.

44. The apparatus as claimed in claim 36 wherein said means for locating comprises a Piezo electric micro actuator.

* * * * *